(12) United States Patent
Johnson et al.

(10) Patent No.: US 6,549,506 B1
(45) Date of Patent: Apr. 15, 2003

(54) PHOTO DETECTOR MOUNTING IN A HEAD GIMBAL ASSEMBLY USED IN AN OPTICAL DATA STORAGE DEVICE

(75) Inventors: Paul R. Johnson, Kaysville, UT (US); David L. Hall, Salt Lake City, UT (US)

(73) Assignee: Iomega Corporation, Roy, UT (US)

( * ) Notice: Subject to any disclaimer, the term of this patent is extended or adjusted under 35 U.S.C. 154(b) by 269 days.

(21) Appl. No.: 09/618,603

(22) Filed: Jul. 17, 2000

(51) Int. Cl.7 ................................................ G11B 17/30
(52) U.S. Cl. ...................................................... 369/222
(58) Field of Search ................................. 369/222, 300

(56) References Cited

U.S. PATENT DOCUMENTS

| 4,167,765 A | 9/1979 | Watrous | 360/103 |
| 4,860,276 A | 8/1989 | Ukita et al. | 369/119 |
| 5,199,090 A | * | 3/1993 | Bell | 369/300 |
| 5,625,617 A | * | 4/1997 | Hopkins et al. | 250/216 |
| 5,687,479 A | 11/1997 | Bennin | 29/885 |
| 5,771,568 A | 6/1998 | Gustafson | 29/603.03 |
| 6,404,706 B1 | * | 6/2002 | Stovall et al. | 369/13.17 |

* cited by examiner

Primary Examiner—David Davis
(74) Attorney, Agent, or Firm—Woodcock Washburn LLP

(57) ABSTRACT

An optical head has a head gimbal assembly on which a light emitting laser is mounted. A tab extends from the assembly and a photo-detector is mounted on the tab. The tab extends from the load beam of the head gimbal assembly. Alternatively, the tab extends from a flexure of the head disk assembly.

8 Claims, 4 Drawing Sheets

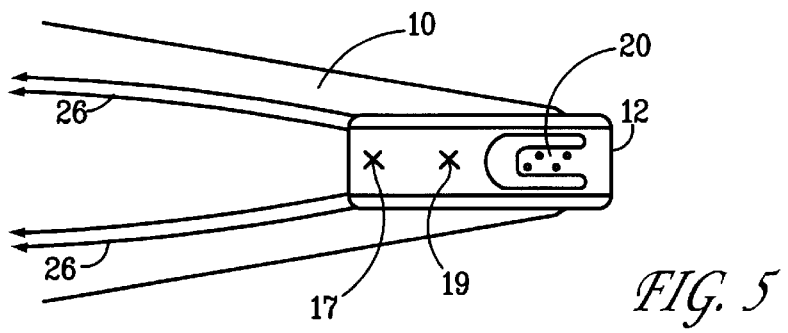
FIG. 5
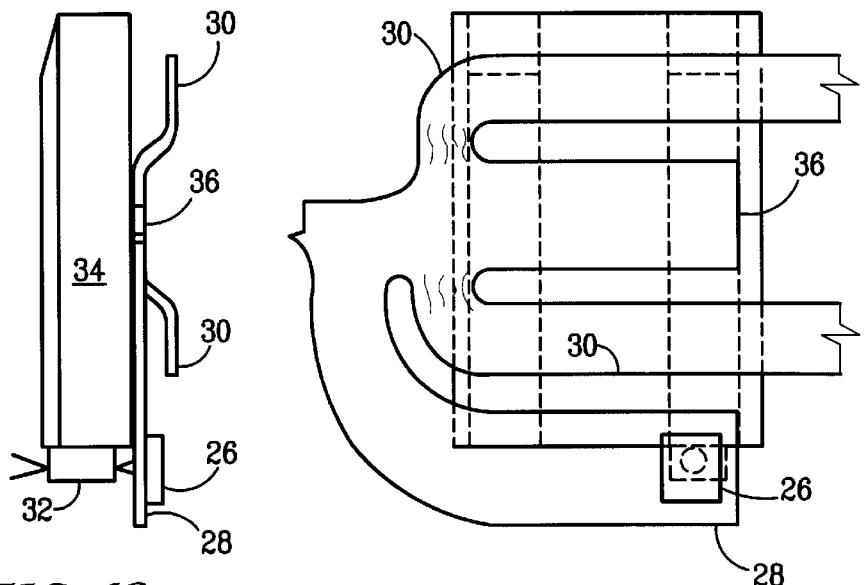
FIG. 6B
FIG. 6A
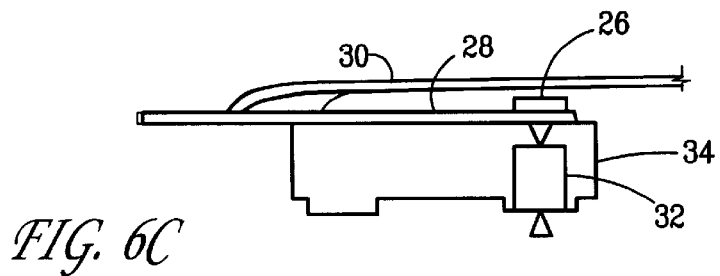
FIG. 6C

PHOTO DETECTOR MOUNTING IN A HEAD GIMBAL ASSEMBLY USED IN AN OPTICAL DATA STORAGE DEVICE

FIELD OF THE INVENTION

This invention relates to an optical head for reading/writing digital data on a recording medium and more particularly to an optical head having a photo detector mounted on a tab extending from the head gimbal assembly.

BACKGROUND OF THE INVENTION

U.S. Pat. No. 4,860,276, Ukita et al. and U.S. Pat. No. 5,625,617, Hopkins et al. disclose optical heads for optical data recording systems. In the optical heads depicted in these patents the detector is either part of the laser structure, is attached to the slider, or light is piped to the detector via an optical fiber, or mirror and lens optical path.

U.S. Pat. No. 4,167,765, Watrous discloses a head gimbal assembly for heads of a type which is commonly referred to as Winchester. These are commonly used for magnetic recording on hard disk drives. The present invention relates to an optical head in which the laser is mounted on a head gimbal assembly of this type.

SUMMARY OF THE INVENTION

In accordance with the present invention the head gimbal assembly of an optical head has a tab extending therefrom. A photo detector is mounted on the tab of the head gimbal assembly. In one embodiment the photo detector is mounted on the load beam of the head gimbal assembly and in another embodiment the photo detector is mounted on the flexure of the head gimbal assembly.

In accordance with the present invention a separate detector is mounted in the optical path of the laser in close proximity and with or without an angular offset. The tab is bendable so that it can be deformed so that minimal or reduced optical feedback from the source laser is provided. The tab can be bent to an off optical axis angle thereby preventing a path for reflection to return into the laser diode.

The separate detector can be independently tested prior to the more costly attachment of the laser/slider assembly thereby saving the cost of the more costly components in the event of a photo-detector failure during the manufacturing process.

In accordance with the invention the mounting tab has preformed locator features for positioning the photo detector optimally. These preformed features may be used for easy application of the bonding adhesive, flex circuit or solders.

Further in accordance with the invention a flex circuit is mounted through the load beam or flexured tab to provide electrical connection and structural support to the photo detector and electrical connection to the laser diode. By mounting the detector onto the load beam of the head gimbal assembly, the effects of the detector's electrical connections will not be imparted onto the moving/gimballing components of the head gimbal assembly.

By using a position type of detector and the active feedback of this detector while the laser is active the positioning of the slider relative to the dimple of the suspension can be detected and adjusted prior to attachment of the head to the gimbal. This requires proper sizing and positioning of the detector onto the suspension and specially designed tooling.

BRIEF DESCRIPTION OF THE DRAWINGS

FIG. 5 shows wiring traces on the load beam; and

FIGS. 6A–6C are plane, end and edge views respectfully of a modification of the invention.

DESCRIPTION OF THE PREFERRED EMBODIMENTS

Figure 1:
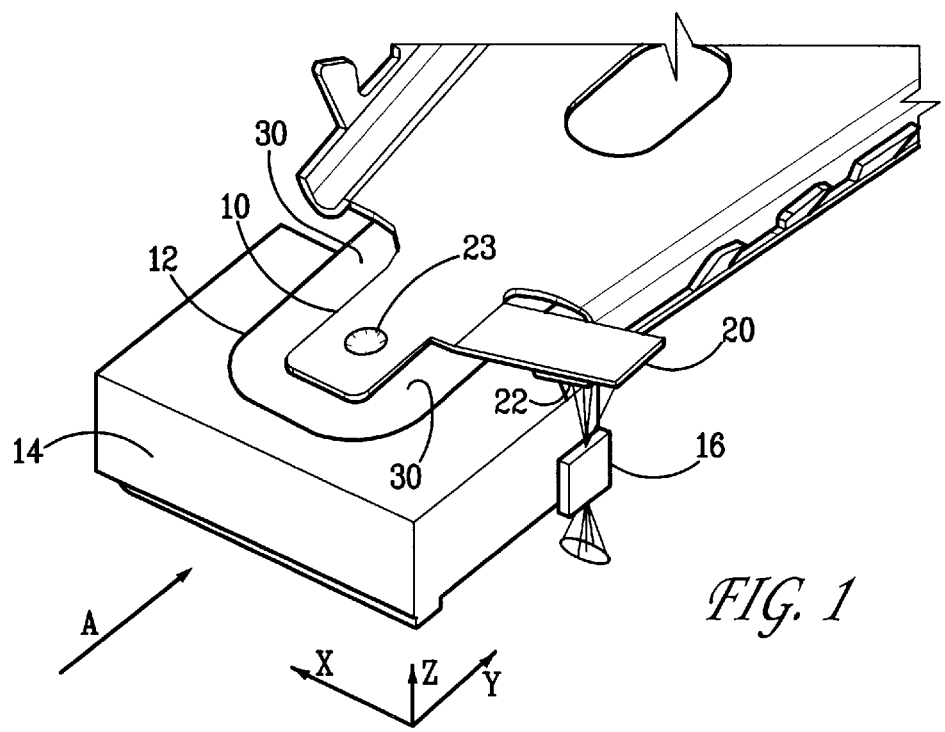
FIG. 1 shows a head gimbal assembly with the tab of the present invention extending from the load beam.
Figure 1A:
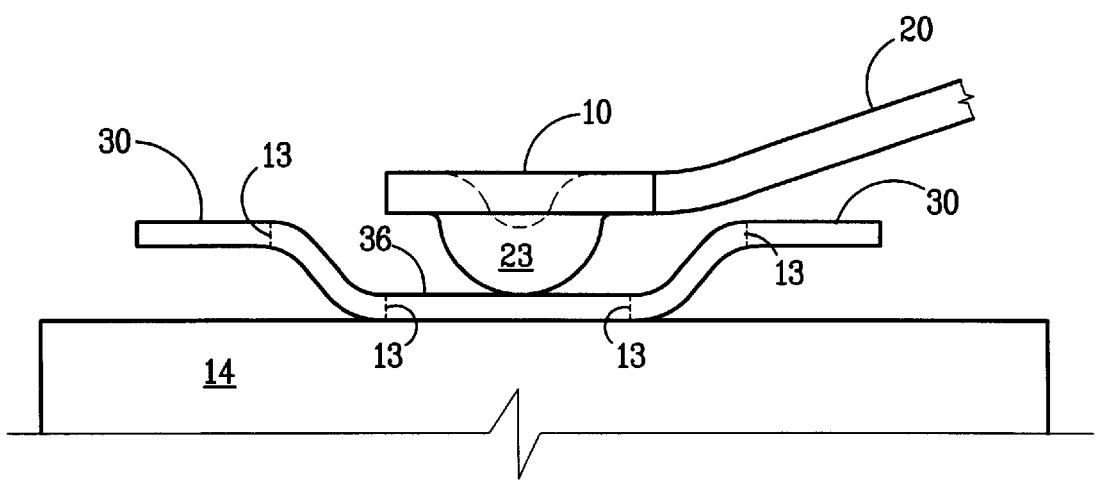
FIG. 1A is an end view in the direction A of FIG. 1.

FIGS. 1–3A show a head gimbal assembly (HGA) which includes load beam 10 and flexure 12. The load beam 10 is welded at 11 to flexure 12. Flexure 12 includes the standard components 30 and 36 which are connected at bends 13. Both ends of component 30 are bent up out of the plane defined by component 36 and tab 20. The standard HGA also includes a dimple 23 which is connected as shown in FIG. 1.

A slider 14 has a laser cavity 16 mounted thereon. Laser 16, typically a laser diode, writes and reads information from the optical data storage media 18.

Figure 2:
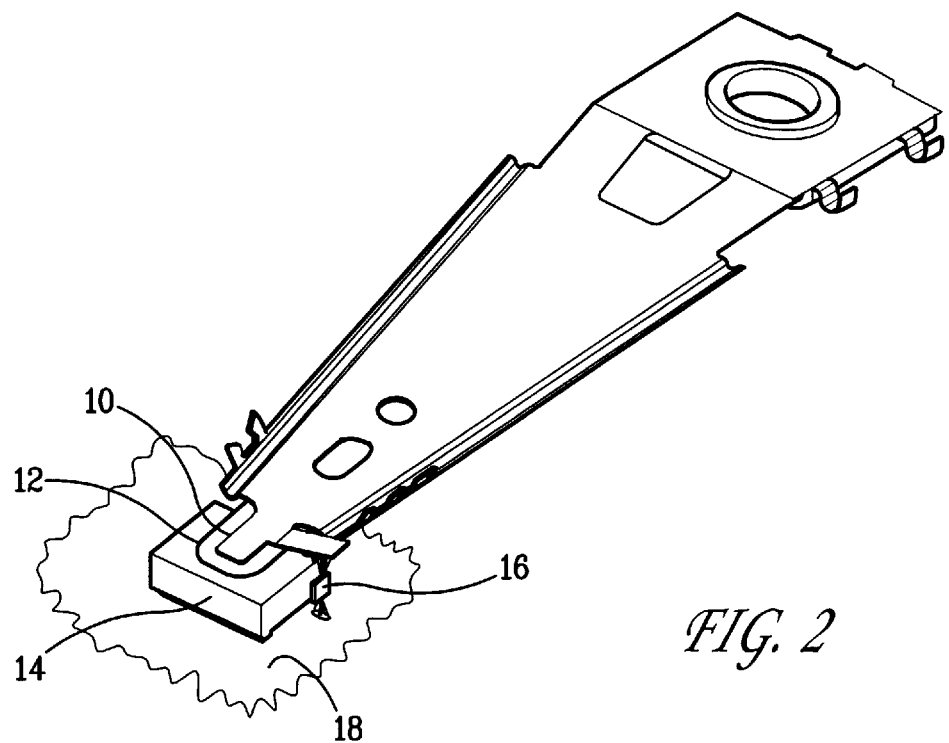
FIG. 2 is similar to FIG. 1 and shows more of the head gimbal assembly.
Figure 3:
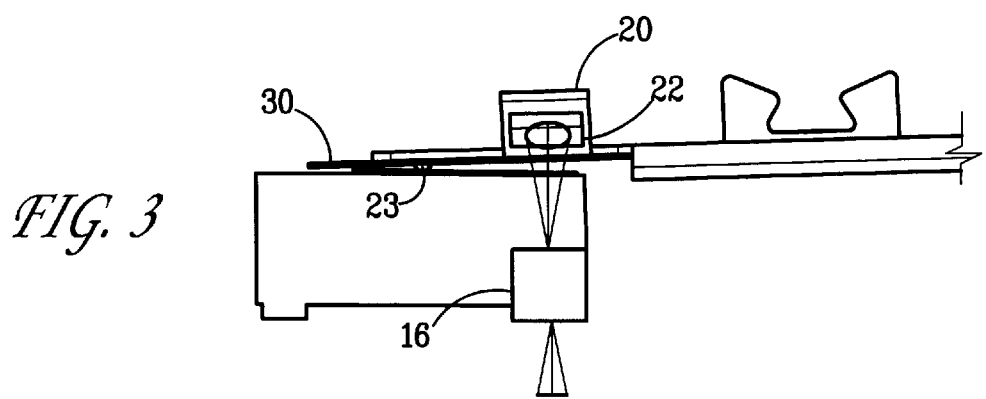
FIG. 3 shows an end view of the head gimbal assembly of FIG. 1.
Figure 3A:
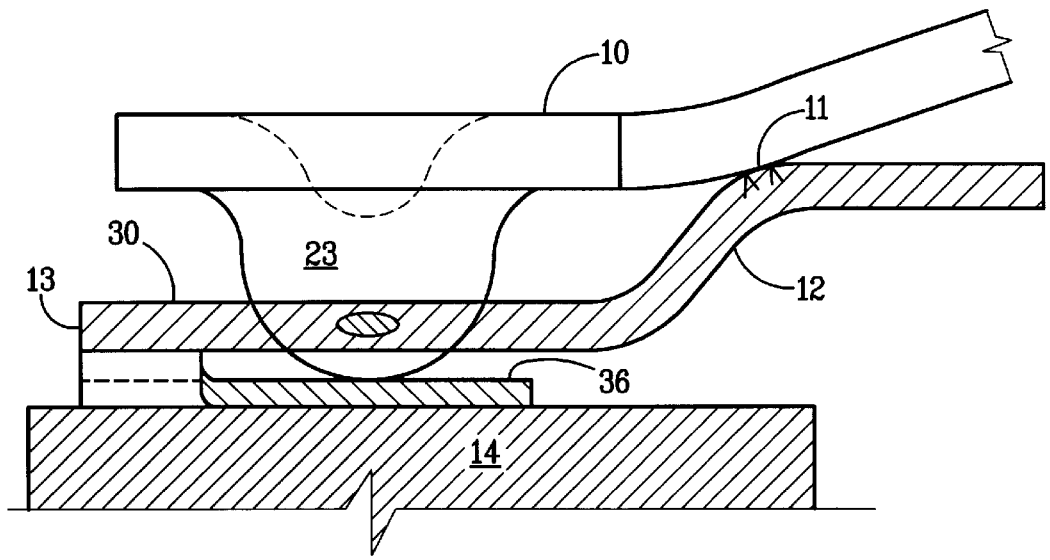
FIG. 3A shows an enlarged view of a portion of the assembly.

In accordance with the present invention a tab 20 extends from the head gimbal assembly. As shown in FIGS. 1–3, the tab 20 extends from the load beam 10. Photo detector 22 is mounted on the tab 20 in close proximity to the laser 16.

In accordance with the invention detector 22 is positioned near laser 16 in a manner that minimizes the possible detrimental effects of wiring. Off axis rotation of detector 22 can be easily accomplished to prevent coupling of light into the back facet of laser 16 which would otherwise create an undesired laser cavity. Tab 20 can be bent in the Z axis to provide clearance for detector 22 and to provide a sufficient off axis (of the laser beam) angle to prevent or reduce reflection back into the laser cavity 16. Such reflection could cause noise in the read back signals when the head to detector distance changes due to normal head to disk flying variations.

Tab 20 can be duplicated around the Y axis to provide a single design for both up-facing or down-facing head gimbal assemblies. A separate tab can be constructed and attached to the load beam 10 or to the flexure 12 in any direction to accomplish the same function. While the head gimbal assembly (HGA) of FIGS. 1–3 is particularly suitable for use in linear actuators, the tab can also be provided on a dogleg type arm used on rotary actuators. Alternatively, a standard (straight) rotary type actuator with a tab extending from the distal end could be used. Extending the tab 20 from the load beam 10, as in FIGS. 1–3, is best suited for wiring of a type referred to as "paddle card" construction. The head gimbal assembly shown in FIGS. 1–3 is more robust for the soldering or bonding of wires. This type of construction minimizes the connections to the moveable slider 14 and thereby minimizes the effects of this connection to the head disk interface (HDI). While these effects can be reduced by correct wire routing or trace routing techniques, the detrimental effects on the HDI due to the detector electrical connections can be eliminated by the embodiment in which the detector is on a tab connected to the load beam.

Figure 4:
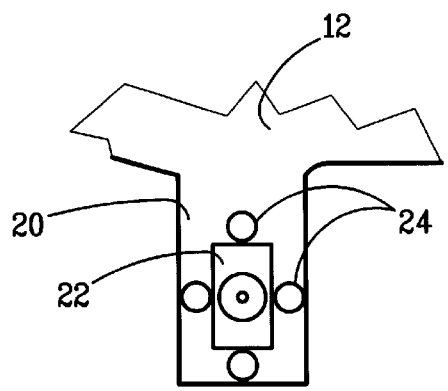
FIG. 4 shows a modification in which the tab extends from the flexure of the head gimbal assembly.

FIGS. 4 and 5 show an embodiment in which the tab 20 extends from the flexure 12. Flexure 12 is welded to load beam 10 at 17 and 19. Mounting the photo detector 22 on a tab which extends from the flexure is best suited for the TSA or flex circuit type electrical connections 26. The term TSA is an abbreviation of "TRACE Suspension Assembly". U.S. Pat. No. 5,687,479, Nov. 18, 1997, Bennin and U.S. Pat. No. 5,771,568, Gustafson show this type of assembly.

In this type of electrical connection the traces typically are laid down onto the flexure prior to the attachment of the flexure to the load beam by welding. The locating features position detectors while it is attached by a bonding adhesive or solder. In the TSA assembly the detector is attached to the trace/flexure assembly and tested prior to attachment to the load beam. The laser/slider assembly is then attached to the flexure after the detector is mounted and electrical connections have been made. This can be done by normal positioning and bonding techniques.

FIG. 4 shows locating features 24 which can be used to locate the detector and/or the flex circuit. These locating features may be tabs, holes, or formed bumps. The locating features position detector while it is attached by a bonding adhesive or solder. When the detector is mounted with sufficient accuracy, the detector can be used to locate the head slider assembly for attachment to the HGA. This can be accomplished by using a signal peaking technique. The laser slider assembly is moved while monitoring the output photo detector 22. The signal can be processed by computing algorithms and the position of the laser slider assembly can be set to a predetermined signal or peak offset as required.

By using a separate position sensitive type of detector as part of a laser/slider assembly to suspension assembly tool, the laser can be activated and positioned relative to the position detector. This detector is not necessarily part of the head gimbal assembly but can be part of a separate tool. The position detector is previously aligned relative to a reference pin in the tooling which locates the suspension in the assembly tool using a master reference part. Once the laser/slider assembly is positioned, the slider can be bonded to the flexure by standard techniques. If the photo detector on the suspension is position sensitive and inexpensive, it can be used for the position sensor.

Mounting the detector on a tab which extends from the flexure is more fully shown in FIGS. 6A, 6B, and 6C. In FIGS. 6A–6C the load beam 10 and the dimple 23 are not shown. The sensor 26 is mounted on the tab, or sensor mounting pad, 28. As is typical, the HGA includes flexure outriggers 30.

Mounting the detector on a tab extending from the flexure has the following advantages. The detector will follow the head. The feature detector will come off the head slider mounting pad. Gimbal and actuator to disk misalignment effects are removed from the optical path. Therefore, the sensor can be made optimally small. The sensor can be held in close proximity to the laser without worry of laser to sensor contact during the extreme motions experienced during head loading/unloading operations. The overall height of the HGA, in the area of the head, can be minimized. A single, external (non-TSA type) flex circuit can be used to provide connections to both the laser and the sensor. The sensor to laser height variations can be minimized to better control the signal variations that arise from these changes in spacing. In line or transverse head mounting can be easily accommodated. Precise angular orientation of the sensor to the laser (target plus or minus ¾ deg.) can be held easily by standard flexure manufacturing techniques.

While particular embodiments of the invention have been shown and described various modification may be made. The appended claims are therefore, intended to cover all such modifications within the true spirit and scope of the invention.

What is claimed is:

1. An optical head comprising:
   a head gimbal assembly;
   a light emitting laser mounted on said assembly;
   a tab extending from said assembly; and
   a photo detector mounted on said tab.

2. The optical head recited in claim 1 wherein said head gimbal assembly includes a load beam, said tab extending from said load beam to hold said detector.

3. The optical head recited in claim 1 wherein said head gimbal assembly includes a flexure, said tab extending from said flexure.

4. The optical head recited in claim 1 wherein tab is bendable, said tab being formed so that there is minimal optical feedback to said laser from said detector.

5. The optical head recited in claim 4 wherein said tab is bent to an off optical axis angle which prevents reflections from returning to said laser.

6. The optical head recited in claim 1 wherein said detector detects reflected output data signals from an optical recording media.

7. The optical head recited in claim 1 wherein said tab has preformed locator features for positioning said photo detector.

8. The optical head recited in claim 7 wherein said preformed features hold said detector for application of one of a bonding adhesive or solder.

* * * * *